Oct. 20, 1925.
P. J. LA PLANT
SWING
Filed Dec. 27, 1924
1,557,940
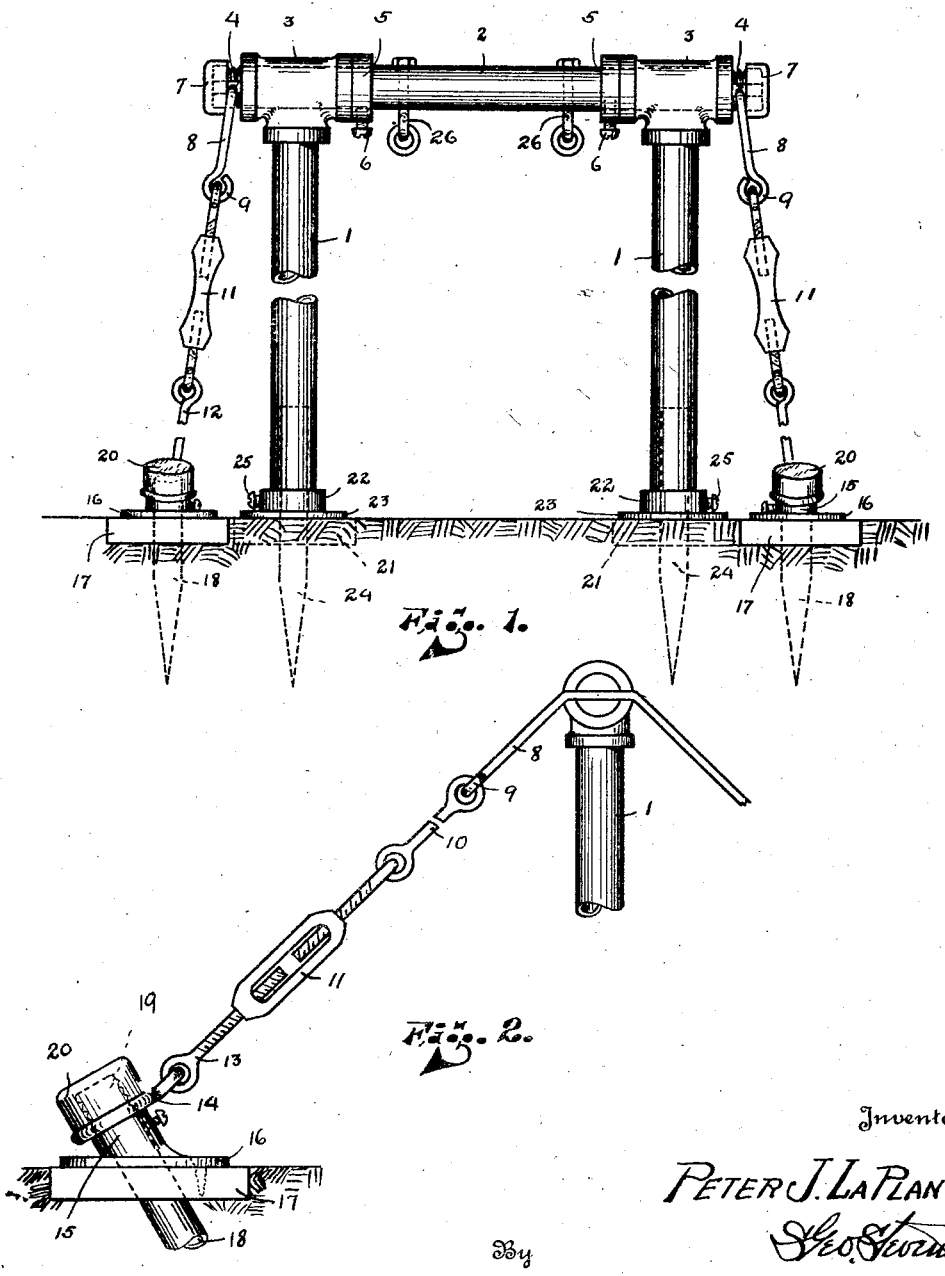
Inventor
PETER J. LA PLANT.
By Geo. Stevens.
Attorney Patented Oct. 20, 1925.

1,557,940

UNITED STATES PATENT OFFICE.

PETER J. LA PLANT, OF DULUTH, MINNESOTA.

SWING.

Application filed December 27, 1924. Serial No. 758,358.

*To all whom it may concern:*

Be it known that I, PETER J. LA PLANT, a citizen of the United States, residing at Duluth, in the county of St. Louis and State of Minnesota, have invented certain new and useful Improvements in Swings, of which the following is a specification, reference being had therein to the accompanying drawing.

This invention relates to portable swings commonly spoken of as lawn swings and has for its principal object to produce a simple and staunch device of this character.

Other objects and advantages of the peculiar construction will appear in the further description of the invention.

Referring now to the accompanying drawing forming part of this application and in which like reference characters indicate like parts:

Figure 1 is a broken elevation of one of the improved swing supports and

Figure 2 is an enlarged fragmental elevation of a portion thereof shown at right angles to Figure 1.

The support comprises the two suitably spaced uprights or members 1, and the crosspiece 2; the uprights being preferably composed of gas pipe as illustrated, each being surmounted by a common gas pipe T 3 through which the cross piece 2 is mounted, the latter being preferably of solid metal.

The extreme ends of the cross piece 2 are externally screw threaded for some considerable distance and each provided with a diametrically disposed slot 4. Just inside of each T 3 and adjustably mounted upon the cross piece 2 is a collar 5 which may be securely fixed to the cross piece by a suitable set screw 6; this being for the purpose of holding the cross piece firmly intermediate of the T's 3. Externally of each extreme end of the cross piece is screw threadedly mounted a cap 7 so that when the guy bridles 8 are placed within the slots 4 they may be tightly impinged against the outer ends of the T's 3 by the screwing up of the caps 7 as is obvious. The extreme ends of each bridle 8 are provided with eyes 9 into which short lengths of wire or chain such as illustrated at 10 may be connected and these latter are attached to suitable turnbuckles 11 for adjustment of the stay lines or guys of which they form a part. To the opposite ends of the turnbuckles may be attached any desired connection as illustrated at 12 or 13 to a link 14 encircling the post or stake which forms the ground connection for the guy line.

This stake comprises an inclined socket 15 having formed integrally therewith the horizontally disposed flange or collar 16 which is attached in any desired manner to a wooden or other suitable block 17 which is preferably installed within the surface of the ground and through which socket or thimble 15 is driven the gas pipe or solid metal stake illustrated at 18. The upper extreme end of each stake 18 is screw threaded as at 19 and provided with a removable internally screw threaded cap 20 so that when this thimble with its block 17 is properly positioned from the uprights 1 a stake may be driven therethrough and assembled as shown forming an ideally secure and simple anchoring means for the ends of the adjustable guy lines.

The ground engaging ends of the uprights 1 are mounted in much the same manner as the ends of the guy lines, there being provided for each a block, preferably of wood, indicated at 21, having a central hole therethrough and upon which block is securely mounted in any desired manner a flanged collar 22, the horizontal flange being indicated at 23, and centrally through each collar and through the hole is driven a sharpened stake, preferably of metal indicated at 24, said stake being allowed to extend some considerable distance above the collar and block. Then over each stake and internally of the collar about same is placed the lower end of the upright 1, each being securely held in position by one or more suitable set screws 25, thus making an exceedingly simple and secure support for the lower end of each of the uprights.

In the erection of the device it is obvious that the same may be conveniently accomplished by first assembling the uprights and cross piece together with the bridles of the guy lines, then after the anchoring means have been provided as previously described the support may be erected and placed in position with the uprights 1 in their respective foundations where they will stand quite securely without additional support or brace until the ends of the guys are anchored to their respective stakes and pulled taught by means of the turnbuckles 11.

Any arrangement of ring bolts such as indicated at 26 may be installed upon the cross piece 2 for the support of one or more swings or other devices desired.

Having thus described my invention what I claim and desire to secure by Letters Patent, is:

1. A fabricated support of the character described comprising two spaced upright members, a horizontally disposed cross piece longitudinally adjustably mounted within the upper ends of the uprights, the extreme ends of the cross piece adjustably carrying bridles externally of the upright members, and adjustable guy lines attached to the bridles.

2. A swing support of the character described comprising two suitably spaced anchoring collars surrounding upwardly extending ground engaging stakes, tubular upright members telescopically mounted upon the stakes and removably secured within the collars, T's screw threadedly mounted upon the upper ends of the upright members, a cross bar or beam adjustably mounted within the T's, guy bridles adjustably mounted within either extreme end of the cross piece and guy lines attached to the ends of the bridles for the purpose described.

In testimony whereof I hereunto affix my signature.

PETER J. LA PLANT.